United States Patent [19]

Kruckenberg et al.

[11] 4,391,606
[45] * Jul. 5, 1983

[54] AZO POLYETHER DYESTUFFS, FORMULATIONS OF THESE DYESTUFFS, THEIR PREPARATION AND THEIR USE

[75] Inventors: Winfried Kruckenberg; Karl H. Schündehütte, both of Leverkusen; Volker Hederich, Cologne, all of Fed. Rep. of Germany

[73] Assignee: Bayer Aktiengesellschaft, Leverkusen, Fed. Rep. of Germany

[*] Notice: The portion of the term of this patent subsequent to Feb. 10, 1998, has been disclaimed.

[21] Appl. No.: 292,860

[22] Filed: Aug. 14, 1981

Related U.S. Application Data

[63] Continuation of Ser. No. 90,374, Nov. 1, 1979, abandoned.

[30] Foreign Application Priority Data

Nov. 22, 1978 [DE] Fed. Rep. of Germany ....... 2850662

[51] Int. Cl.³ .............................................. C09B 1/00
[52] U.S. Cl. .............................................. 8/525; 8/528
[58] Field of Search .................................. 8/525, 528

[56] References Cited

U.S. PATENT DOCUMENTS

| 4,030,882 | 6/1977 | Blackwell | 8/657 |
| 4,105,401 | 8/1978 | Koci et al. | 8/524 |
| 4,249,902 | 2/1981 | Kruckenberg et al. | 8/525 |

Primary Examiner—A. Lionel Clingman

Attorney, Agent, or Firm—Sprung, Horn, Kramer & Woods

[57] ABSTRACT

Dyestuff formulations which contain a dyestuff with at least one of the groupings of the formula

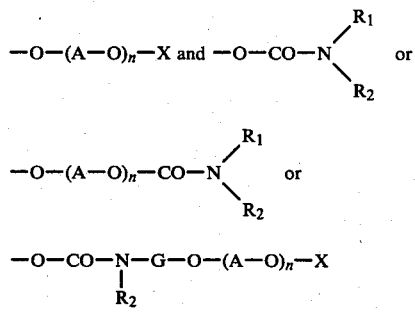

and an emulsifying polar-nonpolar compound, are outstanding suitable for dyeing synthetic fibres since they are well soluble in the dyeing bath and do not require expensive formulation process for their preparation.

In the formulae, the symbols have the following meanings:

G is a bridge member,
A is alkylene,
X is hydrogen, Y, —COY or —CONR₁R₂,
Y is alkyl, cycloalkyl, aralkyl or aryl,
R₁ is hydrogen or Y,
R₂ is hydrogen or alkyl and
n is a number from 1 to 7, with the proviso that n is at least 2 if X is —COY.

16 Claims, No Drawings

AZO POLYETHER DYESTUFFS, FORMULATIONS OF THESE DYESTUFFS, THEIR PREPARATION AND THEIR USE

This is a continuation of application Ser. No. 090,374, filed Nov. 1, 1979, now abandoned.

The present invention relates to dyestuff formulations which contain (a) a dyestuff which is free from sulphonic acid groups and ammonium groups and which contains at least one of the groupings of the formulae

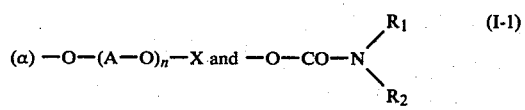

or

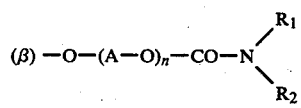

or $$(\gamma) \ -O-CO-N-G-O-(A-O)_n-X \text{ and} \quad (I-3)$$
$$\phantom{(\gamma) \ -O-CO-N}|\phantom{-G-O-(A-O)_n-X}$$
$$\phantom{(\gamma) \ -O-CO-N}R_2$$

(b) an emulsifying polar-nonpolar compound.

In the above formulae, the symbols have the following meanings:

G denotes a bridge member, preferably $C_2$-$C_6$-alkylene,

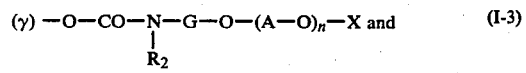

A denotes $C_2$-$C_6$-alkylene,

X denotes hydrogen, Y, —COY or —CONR$_1$R$_2$,

Y denotes optionally substituted alkyl, cycloalkyl, aralkyl or aryl,

R$_1$ denotes hydrogen or Y,

R$_2$ denotes hydrogen or optionally substituted alkyl and n denotes a number from 1 to 7, with the proviso that n is at least 2 if X is —COY.

The radicals $\alpha$, $\beta$, $\gamma$, of which the two first-mentioned are preferred, are bonded to a carbon atom of the dyestuff remaining, viewed formally, after removal of a H or halogen atom, or of an alkoxy or OH group or the like.

The formulations can be in a liquid or pulverulent form and can, in addition to the dyestuff and the emulsifying polar-nonpolar compounds, optionally contain extenders and diluents (especially inorganic salts, such as NaCl and Na$_2$SO$_4$).

These formulations are distinguished by very high solubility in water.

In general, a molar ratio of dyestuff to emulsifier of from 1:0.1 to 1:4 has proved advantageous; a ratio of 1:1 to 1:3 is preferred, but an excess of emulsifier is in general not detrimental. In practice, however, a ratio of 1:2 will in general suffice fully. Frequently, 1:1 dyestuff/emulsifier adducts are particularly advantageous. On the other hand, dyestuffs which intrinsically are highly soluble can also be used with a smaller amount of emulsifier.

The preparation of the dyeing formulations does not require any specific apparatus. Spray drying, drum drying or drying in Venuleth equipment is as suitable as simple tray drying, after combination of the components in normal kettles, or as a combination of adduct formation and drying in any of the abovementioned equipment. A particularly advantageous method is to mix the filter press cake, or the oily or pasty dyestuff, as obtained directly from its method of preparation, with the emulsifiers and, if desired, to convert the mixture in a known manner to the dry pulverulent form. A fact to be singled out is that should comminution of the dyestuff/emulsifier mixture be carried out, it does not require any expensive fine comminution equipment, such as bead mills and vibratory mills, and instead coarse grinding to mean particle sizes not below 50$\mu$ is completely adequate.

Suitable polar-nonpolar auxiliaries for the preparation of the dyeing formulations are those of the general formula (IIa)

$$Ar-(Bd)_u-(L)_v \quad \text{(IIa)}$$

in which

Ar denotes a nonpolar radical with at least 8 consecutive C atoms, with carbocyclic aromatic compounds linked in the 1,4-position being counted as a sequence of 4 carbon atoms, whilst if linked in the 1,2- or 1,3-positions they are counted as a sequence of 2 and 3 respectively, Bd represents a bridge member which links the nonpolar radical Ar and the polar hydrophilic radical L, u denotes an integer from 0 to 5, preferably from 0 to 1, L represents a hydrophilic group which can be cationic, non-ionic or, preferably, anionic and v represents an integer from 1 to 5, preferably 1.

A tabulation of suitable radicals Ar, Bd and L is to be found in Table 1 in "Tenside Detergents", Volume 11, 1974, No. 4, page 186.

Cationic groups L which may be mentioned are primary, secondary and tertiary amines and in amine oxides their protonised form, quaternary ammonium groups, pyridinium, quinolinium or similar groups, or sulphonium or phosphonium derivatives. Uncharged groupings L which may be mentioned are hydroxyalkyl or hydroxyaryl, branched or unbranched polyether chains, derivatives or sorbitol, mannitol, carbohydrates and similar compounds, oxyalkylated derivatives of sorbitol, mannitol and similar compounds, derivatives of ureas, ureides and polypeptides.

Preferred polar-nonpolar compounds correspond to the general formula $$Ar'-L' \quad \text{(IIb)}$$

wherein

Ar' represents an aliphatic hydrocarbon radical with at least 10 C atoms and

L' represents —SO$_3$H, —O—SO$_3$H or OPO$_3$H$_2$ or the corresponding salts.

Examples which may be mentioned are fatty acid soaps, such as sodium laurate, sodium oleate and sodium linoleate, ammonium ricinoleate, oleic acid esters of sodium isethionate, or sodium palmitate, sodium bis-(2- ethylhexyl)-sulphosuccinate, sodium N-methyl-N-oleyltaurate, β-octylphenoxydiethyl ether-β'-Na-sulphonate, sodium isododecylbenzenesulphonate, sodium dodecyl-sulphate, sodium N-oleylsulphanilate, dodecylphosphonic acid, sodium dodecylbenzimidazolesulphonate, alkoxyaryl-sulphates, alkylsulphaminoamyl compounds, dodecylphenol-sulphates, dodecylbenzenesulphamic acid, dibutylnaphthol-sulphates and dioctylnaphtholsulphates. Cationic surfactants to be mentioned are dodecylamino acetate, dodecylbenzyldimethylammonium chloride and heptadecyl-N-aminoethylimidazoline acetate.

The new dyeing formulations are in a liquid or dissolved form under the dyeing or printing conditions. This in most cases makes it superfluous to employ additional surface-active agents, such as dispersing agents, protective colloids, levelling agents and also carriers when dyeing and printing.

The dyestuffs contained in the dyeing formulations according to the invention are in some cases known (compare U.S. Pat. No. 3,445,454, Swiss Pat. No. 427,081 and Japanese Pat. No. 49/19,181) or can be obtained in accordance with known processes, and can belong to a great variety of dyestuff or brightener categories.

Examples of suitable compounds are azo dyestuffs, azomethine dyestuffs, anthraquinone dyestuffs, nitrodiarylamine dyestuffs, quinophthalone dyestuffs, perinone dyestuffs, acridone dyestuffs, naphthazarine dyestuffs or coumarin dyestuffs and brighteners, provided they are free from ionic groups, with the exception of carboxyl groups. Anthraquinone dyestuffs and above all azo dyestuffs are preferred.

The formulations according to the invention can be prepared in various ways. Thus it is possible to mix the dyestuffs with the emulsifiers, for example by working into a paste or melting together (for example at temperatures of 50°–150° C.).

The dyestuffs containing the groupings I-3 (on the one hand) and the dyestuffs containing the groupings I-1, wherein A is a straight chain and n is at least 3, if $R_1$ represents aryl, and those containing the groupings I-2, which are bonded to azo dyestuffs or to anthraquinone dyestuffs, n being greater than 2, have not previously been described in the literature and are therefore also a subject of the present invention.

These new dyestuffs for example correspond to the formula

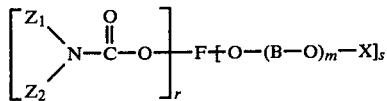

wherein

X has the abovementioned meaning and

F denotes the radical of a dyestuff which is free from sulphonic acid groups and ammonium groups, B denotes a straight-chain $C_2$–$C_6$-alkylene radical, $Z_1$ denotes hydrogen, optionally substituted cycloalkyl, aralkyl, aryl or, preferably, halogen-free $C_1$–$C_4$-alkyl, $Z_2$ denotes $C_1$–$C_4$-alkyl or, preferably, hydrogen, r and s denote the numbers 1 or 2 and m denotes numbers from 1 to 6, with the proviso that m is at least 2 if X represents —COY, and that m is at least 3, preferably at least 4, if $Z_1$ denotes phenyl.

Preferably, F represents the radical of a monoazo dyestuff.

Within this dyestuff category, preferred compounds are those which correspond to the formula

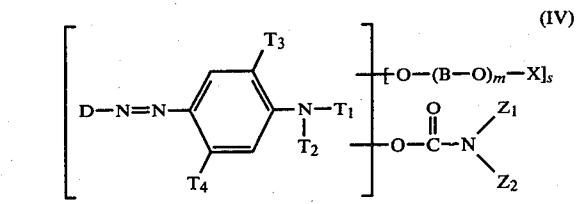

wherein

B, X, $Z_1$, $Z_2$, s and m have the abovementioned meaning,

D represents the radical of a diazo component, for example of the benzthiazole, benzisothiazole, thiazole, thiadiazole, thiophene and above all benzene series, $T_1$ represents hydrogen, optionally substituted alkyl or aralkyl, $T_2$ represents $T_1$ or optionally substituted aryl, $T_3$ represents hydrogen, alkyl, phenoxy, alkoxy or halogen and $T_4$ represents $T_3$ or acylamino the radical —O—(BO)$_m$—X being present as alkoxy radicals $T_3$ and/or $T_4$ or—like the radical OCONZ$_1$Z$_2$—being bonded to hydrocarbon radicals $T_1$ and/or $T_2$, and m being subject to the abovementioned proviso.

Suitable alkyl radicals $T_1$/$T_2$ are those with 1 to 4 C atoms which can be substituted by a CN, OH, alkoxy, alkoxycarbonyl, alkoxycarbonyloxy or alkylcarbonyloxy group or by halogen. They can also be unsaturated radicals, such as allyl and butenyl.

Other suitable alkyl radicals are preferably normal alkyl radicals, which are unsubstituted and have 1–4 C atoms.

Suitable alkoxy radicals mentioned in any context (thus also including, for example, alkoxycarbonyl radicals) also have 1–4 C atoms.

For the purposes of the present invention "halogen" is above all to be understood as F, Br and especially Cl.

Suitable cycloalkyl radicals mentioned in any context are cyclohexyl and methylcyclohexyl.

Suitable aryl radicals mentioned in any context are above all phenyl radicals which can be monosubstituted, disubstituted or trisubstituted by halogen, alkoxy or alkyl.

Suitable aralkyl radicals mentioned in any context are in particular benzyl and phenylethyl radicals, in which the phenyl radicals can be substituted as described above.

Suitable acylamino radicals are those of the formula

wherein $Q_1$ denotes H or $CH_3$ and $Q_2$ represents —COY, —$SO_2$Y, —$CO_2$Y, $CONH_2$ or

Suitable alkylene radicals are above all —CH$_2$CH$_2$— and —(CH$_2$)$_4$—.

Particularly preferred dyestuffs are those of the formula (IV) wherein

D represents a radical of the benzisothiazole, 1,3,5-thiadiazole or 1,3,4-thiadiazole series or, preferably, of the benzene series, T$_1$ represents H, C$_1$–C$_4$-alkyl, C$_1$–C$_4$-alkylene-Z, C$_1$–C$_4$-alkylene-W$_1$ or C$_1$–C$_4$-alkylene-W$_2$, T$_2$ represents C$_1$–C$_4$-alkyl or C$_1$–C$_4$-alkylene-W$_2$, T$_3$ represents H, methyl, ethyl, methoxy, ethoxy or Cl, T$_4$ represents T$_3$, formylamino or C$_1$–C$_4$-alkylcarbonylamino which is optionally substituted by C$_1$–C$_2$-alkoxy, m represents 2 to 4, s represents 1 or 2, Z represents OH, OCH$_3$, CN, phenoxy, phenyl, C$_1$–C$_4$-alkylsulphonyl or C$_1$–C$_4$-alkylcarbonyl, Z$_1$ represents hydrogen, methyl, ethyl or cyanoethyl, Z$_2$ represents hydrogen, W$_1$ represents —O—(B—O)$_m$—X', W$_2$ represents —OCONZ$_1$Z$_2$, B denotes C$_2$–C$_4$-alkylene, and X' denotes H, C$_1$–C$_4$-alkyl, phenyl, C$_2$–C$_4$-chloroalkyl, cyanoethyl, C$_1$–C$_4$-alkylcarbonyl or benzoyl, with the proviso that at least 1 radical W$_1$ and 1 radical W$_2$ is present and that m is at least 2 if X' denotes alkylcarbonyl or benzoyl, and that the dyestuffs of the earlier applications are excluded.

Very particularly preferred dyestuffs of the stated formula are those wherein D represents

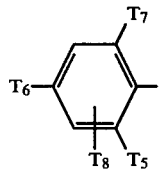

(V)

wherein

T$_5$ to T$_7$ denote hydrogen, Cl, Br, NO$_2$, CH$_3$, CF$_3$, CN, SO$_2$CH$_3$ or SO$_2$C$_2$H$_5$, but preferably do not simultaneously denote H or NO$_2$ and T$_8$ denotes hydrogen, Cl or CN.

Amongst these, preferred dyestuffs of the formula (IV) are, in turn, those wherein T$_4$=H or CH$_3$. Other dyestuffs of interest are those of the formula

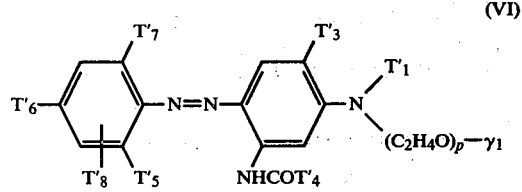

(VI)

wherein

T'$_1$ denotes C$_2$H$_4$OCONHZ$_1$' or C$_4$H$_8$OCONHZ$_1$',

T'$_3$ denotes H, methyl, methoxy or ethoxy,

T'$_4$ denotes H, methyl, ethyl, methoxymethyl or ethoxymethyl,

T'$_5$ denotes H, Cl, Br, CN or NO$_2$,

T'$_6$ has one of the meanings of T'$_5$ but not both the radicals are H,

T'$_7$ denotes H, Cl, Br or CN,

T'$_8$ denotes H, Cl or CN,

X$_1$ denotes H, optionally CN— or Cl-substituted C$_2$H$_4$-alkyl or, preferably, methyl, Z'$_1$ denotes C$_1$–C$_4$-alkyl, preferably CH$_3$ and p denotes 2 to 4.

In addition to the dyestuffs of the formulae IV and VI, other preferred types are those which instead of the benzene-based diazo component contain a radical of the formula

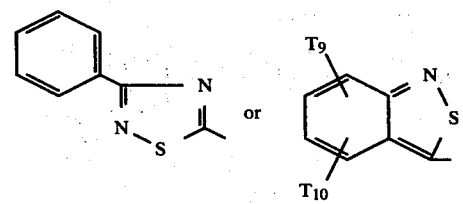

wherein T$_9$/T$_{10}$ denote H, halogen, nitro, alkyl, alkoxy or alkylcarbonyl Preferably, T$_9$ in H and T$_{10}$ is NO$_2$.

Within the scope of the formula III, other preferred azo dyestuffs are those of the formula

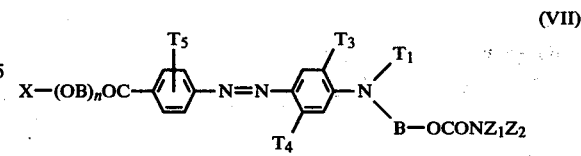

(VII)

wherein

B, X, T$_1$–T$_4$, Z$_1$, Z$_2$ and n have the stated meaning and

T$_5$ represents H, Cl, NO$_2$ or COO—C$_1$—C$_4$-alkyl, as well as their corresponding preferred forms.

Further dyestuffs preferred within the scope of the formula III are those of the formula

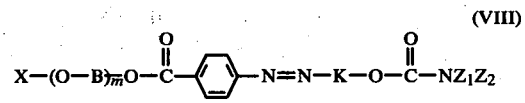

(VIII)

wherein

Z$_1$, Z$_2$, B, X and m have the abovementioned general and specific meanings and K represents the radical of a heterocyclic coupling component, for example of the pyrazole, pyridine, pyrimidine or quinoline series.

Suitable radicals of such coupling components are:

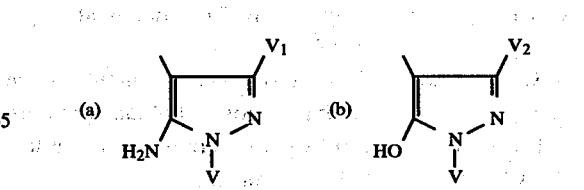

-continued

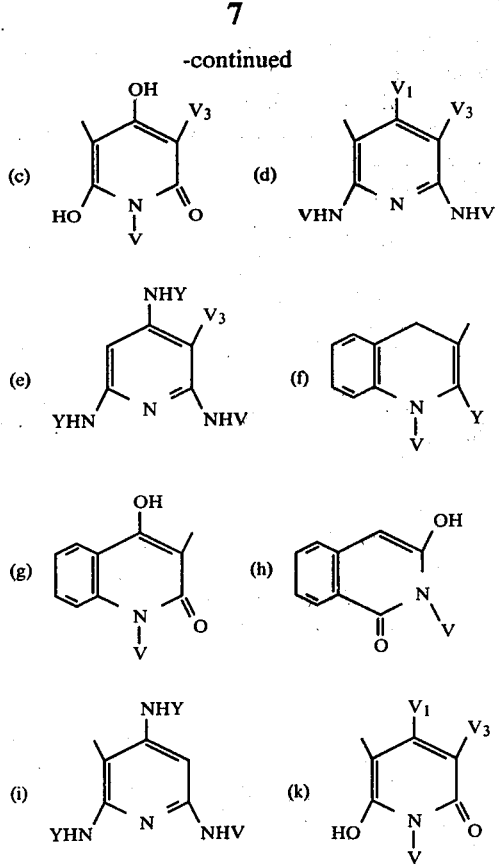

wherein
V represents

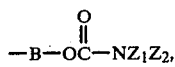

$V_1$ represents $Z_2$,
$V_2$ represents $Z_2$, COOY or $CON(Z_2)_2$ and
$V_3$ represents CN, COOY or $CON(Z_2)_2$ and wherein B, Y, $Z_1$ and $Z_2$ have the abovementioned meanings.

The radicals (a), (b) and (c) are particularly preferred, with $V_3$ preferentially representing CN.

A further group of new, interesting dyestuffs is characterised by the formula

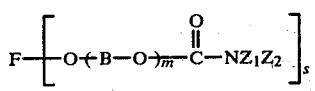
(IX)

wherein F, B, $Z_1$, $Z_2$, m and s have the abovementioned meaning with the exception of the polyether dyestuffs, containing carbamate groups, of German Patent Application No. P 27 51 784.6.

Suitable radicals F are those of the quinophthalone and anthraquinone series and above all of the azo series.

Preferred azo dyestuffs within the scope of the formula (IX) are those of the formula (X)

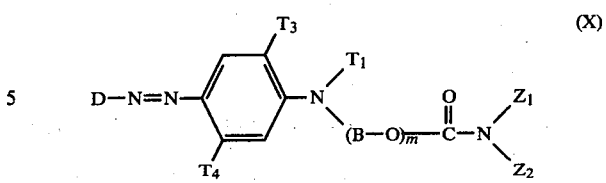
(X)

wherein m, B, D, $T_1$, $T_3$ $T_4$, $Z_1$ and $Z_2$ have the abovementioned meaning, with the exception of the dyestuffs of the said earlier application.

Preferred azo dyestuffs within the scope of the formula (X) are those of the formula

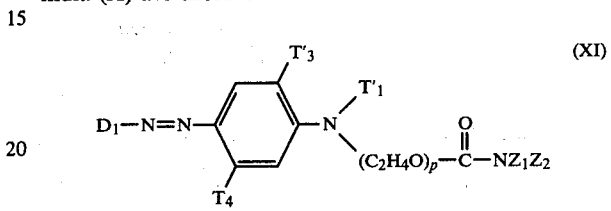
(XI)

wherein $D_1$ represents

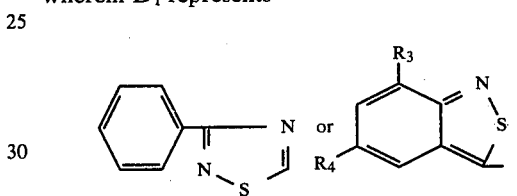

wherein
$R_3$ is H, $CH_3$, Cl or Br and
$R_4$ is H, Cl, CN or $NO_2$ or
$D_1$ represents

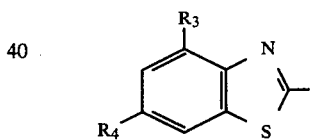

or especially

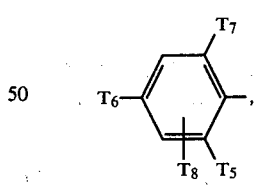

and the remaining substituents have the stated meaning, with the abovementioned exception.

Dyestuffs wherein $T_1$ or $T_1'$ represents H or $C_1$-$C_4$-alkyl-Z or $C_1$-$C_4$-alkyl-$W_1$-($W_2$) are particularly preferred.

Finally, dyestuffs of the formula

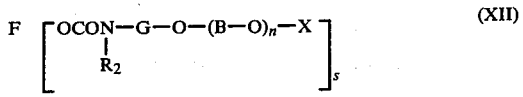
(XII)

wherein
the symbols have the abovementioned meanings and

F preferably represents an azo dyestuff radical, constitute a further group of valuable dyestuffs, the dyestuffs of German Patent Application No. P 27 24 951.0 being excluded.

Preferred dyestuffs of the formula XII correspond to the formula

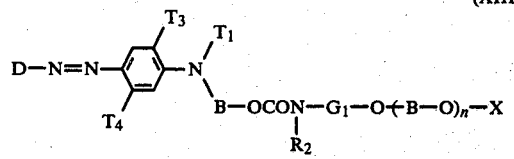
(XIII)

wherein the radicals shown have the abovementioned general and specific meanings
and wherein $C_1$ represents $C_2$-$C_3$-alkylene.

Particularly preferred dyestuffs are those of the formula

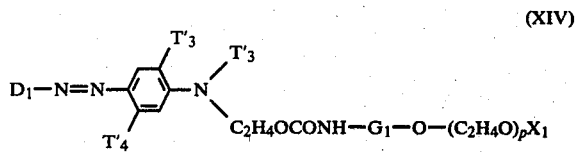
(XIV)

and very particularly those wherein D is

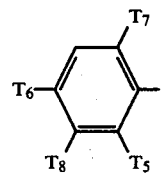

Preferred anthraquinone dyestuffs within the scope of the formula (XII) are those of the formulae

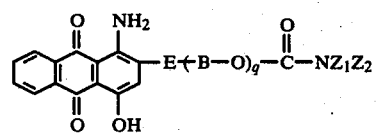
(XV)

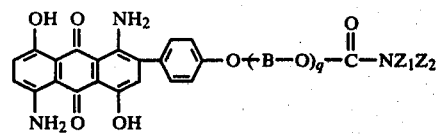
(XVI)

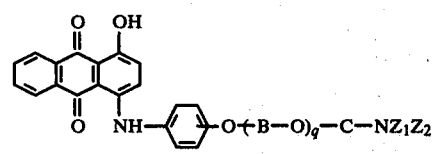
(XVII)

wherein
B, $Z_1$, $Z_2$ and p have the abovementioned general and specific meanings and
E represents S, —O—arylene—O—, a direct bond or, preferably, O, and
q represents 3–7, preferably 3–4.
Preferably, $Z_1$ represents $C_1$-$C_4$-alkyl and $Z_2$ represents H.

Suitable quinophthalone dyestuffs are, for example, those of the formula

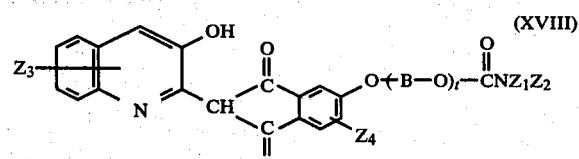
(XVIII)

wherein
B, $Z_1$ and $Z_2$ have the abovementioned meaning, t represents 2–6 and
$Z_3$ and $Z_4$ represent H, $CH_3$ or halogen, especially Br. Preferably $Z_3$ and $Z_4$ are each H.

The new dyestuffs can be prepared according to methods which are in themselves known, by introducing the polyether radicals and the carbamate radicals in the usual manner into suitable chromophoric systems.

The new azo dyestuffs are obtained, for example, by coupling diazotised amines of the formula

D—NH$_2$ with anilines of the formula

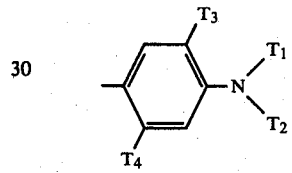

in which formulae
D, $R_1$, $T_2$, $T_3$ and $R_4$ have the abovementioned meaning and
at least one of these compounds contains the radical of the formula —O—(AO)$_n$—X or —O—(BO)$_m$—Y and the radical —OCONR$_1$R$_2$ or —OCONZ$_1$Z$_2$, where the symbols have the abovementioned meaning.

Some of the coupling components are known (compare the patent specifications quoted above).

The new coupling components are obtained in a manner which is in itself known by reacting corresponding NH— or OH-compounds with compounds of the formula

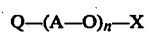
Q—(A—O)$_n$—X       (XIX)

wherein
X represents Y and
Q represents halogen, preferably Cl or

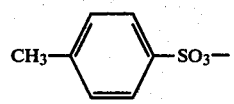

or $CH_3$—$SO_3$—,
in a manner which is in itself known.

The compounds of the formula (XIX) are known or are easily obtainable in accordance with known methods (compare German Offenlegungsschrift No. 1,544,599, page 22), for example by oxyalkylating compounds of the formula YOH, subjecting the reaction product to fractional distillation, replacing the terminal OH group in the various fractions by the radical Q (for example by reaction with SOCl₂ or methanesulphochloride) and, if necessary, again carrying out a distillation, to remove decomposition products.

Compounds of the formula XIX, wherein X is CONR₁R₂, are obtained from compounds of the formula Q—(A—O)$_n$—H by reaction with isocyanates.

Dyestuffs of type I-3 are obtained, for example, by reacting dyestuffs of the formula F—OH with

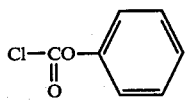

to give

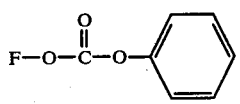

and then reacting the product with H₂N—(A—O)$_n$—X, which again is obtainable from Q—(A—O)$_n$—X by amination.

The new dyestuffs are eminently suitable for dyeing and printing synthetic fibre materials, especially those consisting of aromatic polyesters and cellulose esters, on which the dyestuffs produce dyeings and good general fastness properties, especially good fastness to sublimation, washing and light.

In the examples which follow, "parts" denote parts by weight.

The alkyl radicals mentioned are, in general, n-alkyl radicals.

EXAMPLE 1

71 parts of sodium nitrite, in the form of a 30% strength aqueous solution, are added dropwise in the course of 2 hours, at 0° to 5° C., to a mixture of 172.5 parts (1 mol) of 2-chloro-4-nitraniline in 420 parts of water and 480 parts of 30% strength hydrochloric acid, whilst stirring and constantly adding ice. The mixture is then stirred for a further 3 hours, before it is clarified with 10 parts of active charcoal and the excess nitrite is destroyed with amidosulphonic acid. 340 parts of the compound of the formula

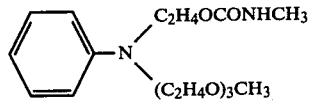

dissolved in 680 parts of glacial acetic acid and 680 parts of water are introduced into the clear diazonium salt solution thus obtained. The reaction mixture is stirred for a further 3 hours and is then cautiously neutralised, with addition of seeding crystals and sodium acetate. The resulting dyestuff is filtered off and washed until neutral. It melts at about 85° C. 100 parts of this dyestuff are worked into a paste with 100 parts of sodium dodecyl-sulphate and 100 parts of sodium sulphate. The resulting paste is diluted with water until it is just pourable. It is heated to 70°–80° C. and fed to a spray drier. A pulverulent formulation is obtained, which dissolves smoothly in hot water and remains in solution even after cooling, and even at high concentration. Dyestuffs formulations with similar properties are obtained if, in finishing the dyestuff, 488 parts of an oxyethylated oleyl alcohol containing 19 ethylene oxide units are employed instead of the 100 parts of dodecyl-sulphate. If 100 parts of the dyestuff obtained above are stirred with 264 parts of a 50% strength aqueous solution of dodecylbenzylammonium chloride, whilst warming, a paste is obtained which rapidly dissolves, at high concentration, in water. Using the dyestuff formulations described, synthetic and semi-synthetic fibres, especially polyester fibres, can be dyed in the usual manner. Red dyeings having good general fastness properties are obtained.

EXAMPLE 2

85 parts by volume of nitrosylsulphuric acid are added dropwise, at 0° to −5° C., to a homogeneous mixture of 88.5 parts of 3-phenyl-5-amino-1,2,4-thiadiazole in 1,000 parts of 85–90% strength phosphoric acid. The orange-yellow reaction mixture is then stirred for a further 5 hours at the stated temperatures, with the apparatus closed. The resulting syrupy diazonium salt solution is run slowly, with good stirring, into a solution of 148 parts of the compound of the formula

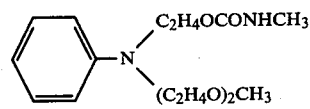

in 350 parts of glacial acetic acid and 400 parts of ice water, whilst continuously adding ice. The mixture is then neutralised in the course of 3 hours at 0° C. by means of sodium hydroxide solution, whilst adding ice. As soon as the dyestuff begins to precipitate, seeding crystals are added. Neutralisation is cautiously continued until the dyestuff has precipitated completely. The dyestuff is then filtered off and washed until neutral (melting point about 90° to 95° C.). 100 g of this moist dyestuff are triturated with 100 parts of dodecyl-myristyl-sulphate and 100 parts of sodium sulphate to give a paste, which is dried in a spray-drier. A dyestuff powder is obtained, which readily dissolves in water. Dyestuff formulations with similar properties are obtained if instead of the above-mentioned anionic emulsifier, 280 parts of a 50% strength aqueous solution of dodecylbenzylammonium chloride or 238 parts of an oxyethylated oleyl alcohol with 19 ethylene oxide units are used.

The resulting dyestuff formulations dye polyester fibres in clear red shades.

EXAMPLE 3

10.1 parts of 5-nitro-3-amino-7-chloro-2,1-benzisothiazole are dissolved, at 10° C., in 65 parts by volume of concentrated sulphuric acid at 10° to 15° C. 50 parts of a 17:3 glacial acetic acid/propionic acid mixture are added dropwise to the above solution at 0° to 5° C., whilst cooling. Thereafter, 9 parts by volume of nitrosylsulphuric acid (100 parts by volume correspond to 42 parts of sodium nitrite) are added dropwise and the mixture is stirred for about 3 hours at 0° to 5° C. 0.5 parts of urea is then added and thereafter the amount of the amine of the formula

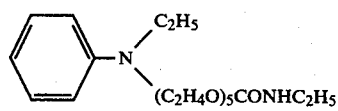

equivalent to the diazo component is added dropwise, as a solution in 50 parts by volume of a 17:3 glacial acetic acid/propionic acid mixture, whilst stirring and cooling; stirring is then continued for half an hour after which the mixture is stirred into ice water and rapidly neutralised with sodium acetate and sodium hydroxide solution. The resulting dyestuff, of the formula

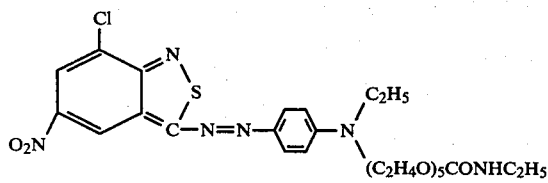

is separated off and washed with water.

When stirred thoroughly for a fairly lengthy period, whilst warming, with about twice its amount by weight of a hot aqueous solution, of about 50% strength, of a technical-grade myristyl-sulphate, the resulting dyestuff formulation readily dissolves in a warm dyebath, which can then be used for dyeing in the customary manner. For example, polyester fibres are dyed, in such a dyebath, in blue shades having good fastness characteristics.

The coupling component had been prepared as follows: A mixture of 121 g of N-ethylaniline, 260 g of $Cl(C_2H_4)_5H$, 80 g of chalk and 10 ml of water was stirred for 20 hours at 130°–140° C. Thereafter, a solution of 80 g of $Na_2SO_4$ in 130 g of $H_2O$ was added and stirring was continued for 1 hour at 80°–90° C. The resulting calcium sulphate was then filtered off and the organic phase was separated off and fractionated in vacuo. The fraction passing over at 190°–197° C. (1.7 mbar) was processed further as follows: 58 g of ethyl isocyanate were slowly added to 150 g of the said fraction at 110°–120° C. After the slightly exothermic reaction had subsided, stirring was continued for 4 hours at 120° C. The reaction product was pure enough for the azo coupling reaction.

If the procedure in one of the preceding examples is followed, but the starting materials listed in the table below are used, valuable azo dyestuffs are again obtained.

| No. | Diazo component | Coupling component | Colour shade on polyester |
|---|---|---|---|
| 1 | $O_2N$—⌬—$NH_2$ with CN | ⌬—N($C_2H_4CN$)($C_2H_4OCONHC_3H_6(OC_2H_4)_2OC_4H_9$) | yellowish-tinged red |
| 2 | " | ⌬—N($C_2H_4OCH_3$)($C_2H_4OCONH(OC_2H_4)_3C_4H_9$) | ruby |
| 3 | " | ⌬—N($C_2H_4O$⌬)($C_2H_4OCONHC_3H_6(OC_2H_4)_4OC_3H_7$) | " |
| 4 | Cl—⌬—$NH_2$ with CN | ⌬—N($C_2H_4CN$)($C_2H_4OCONHC_3H_6(OC_2H_4)_2OC_4H_9$) | orange |
| 5 | " | ⌬—N($C_2H_4O$⌬)($C_2H_4OCONC_3H_6(OC_2H_4)_6OCH_3$, H) | " |
| 6 | " | ⌬—N($C_2H_4O$⌬)($C_2H_4OC_2H_4OCONH(C_2H_4O)_3CH_3$) | " |
| 7 | ⌬—C=N / N=C—$NH_2$ \ S | ⌬—N($C_2H_4CN$)($C_2H_4OCONH(C_2H_4O)_5CH_3$), $CH_3$ | red |

-continued

| No. | Diazo component | Coupling component | Colour shade on polyester |
|---|---|---|---|
| 8 | " | 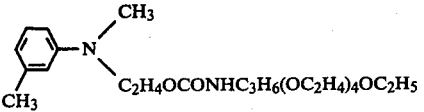 | red |
| 9 | 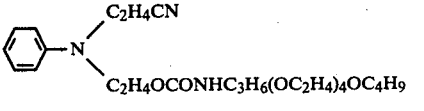 | 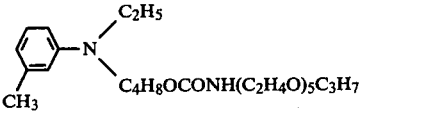 | reddish-tinged blue |
| 10 | " | 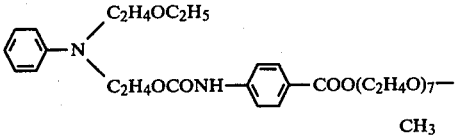 | blue |
| 11 | O₂N—⟨⟩—NH₂, Cl | 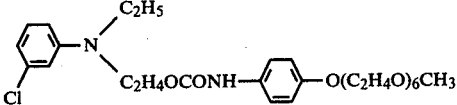 | red |
| 12 | " | 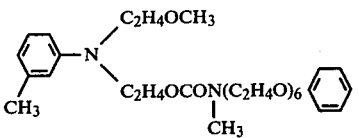 | red |
| 13 | 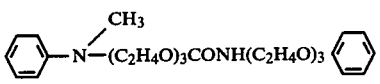 | 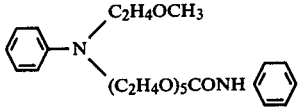 | violet |
| 14 | " | 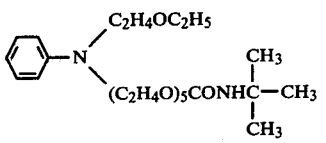 | violet |
| 15 | O₂N—⟨⟩—NH₂, Cl | 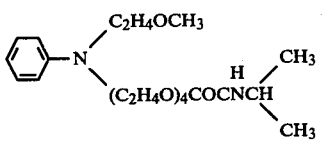 | red |
| 16 | " | 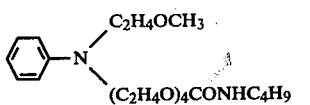 | red |
| 17 | " | 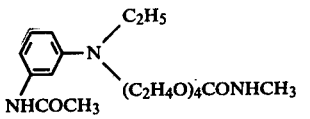 | red |
| 18 | " | | red |
| 19 | " | | ruby |

Row 8 coupling: N(CH₃)(C₂H₄OCONHC₃H₆(OC₂H₄)₄OC₂H₅) on 3-methylphenyl

Row 9 diazo: NO₂-substituted benzisothiazolamine; coupling: N(C₂H₄CN)(C₂H₄OCONHC₃H₆(OC₂H₄)₄OC₄H₉) on phenyl Row 10 coupling: N(C₂H₅)(C₄H₈OCONH(C₂H₄O)₅C₃H₇) on 3-methylphenyl Row 11 coupling: N(C₂H₄OC₂H₅)(C₂H₄OCONH—C₆H₄—COO(C₂H₄O)₇CH₃) on phenyl Row 12 coupling: N(C₂H₅)(C₂H₄OCONH—C₆H₄—O(C₂H₄O)₆CH₃) on 3-chlorophenyl Row 13 diazo: 2-amino-5-nitrothiazole; coupling: N(C₂H₄OCH₃)(C₂H₄OCON(C₂H₄O)₆C₆H₅)(CH₃) on 3-methylphenyl Row 14 coupling: N(CH₃)((C₂H₄O)₃CONH(C₂H₄O)₃C₆H₅) on phenyl Row 15 coupling: N(C₂H₄OCH₃)((C₂H₄O)₅CONHC₆H₅) on phenyl Row 16 coupling: N(C₂H₄OC₂H₅)((C₂H₄O)₅CONHC(CH₃)₃) on phenyl Row 17 coupling: N(C₂H₄OCH₃)((C₂H₄O)₄COCNH-CH(CH₃)₂) on phenyl Row 18 coupling: N(C₂H₄OCH₃)((C₂H₄O)₄CONHC₄H₉) on phenyl Row 19 coupling: N(C₂H₅)((C₂H₄O)₄CONHCH₃) on 3-(NHCOCH₃)phenyl

| No. | Diazo component | Coupling component | Colour shade on polyester |
|---|---|---|---|
| 20 | " | ![structure] N(CH₃)(C₂H₄O)₄CONHCH₃ on phenyl | red |
| 21 | " | ![structure] 3-methylphenyl-N(CH₃)(C₂H₄O)₄CONHC₂H₄CN | red |
| 22 | " | ![structure] 3-methylphenyl-N(C₄H₉)(C₂H₄O)₄CON(CH₃)C₂H₄CN | red |
| 23 | " | ![structure] phenyl-N(CH₂CH=CH₂)(C₂H₄O)₅CONHCH(CH₃)₂ | red |
| 24 | " | ![structure] 2,5-dimethylphenyl-N(CH₃)(C₂H₄O)₅CON(CH₃)₂ | red |
| 25 | O₂N—C₆H₃(CN)—NH₂ | ![structure] phenyl-N(C₂H₅)(C₂H₄O)₅CON(CH₃)₂ | ruby |
| 26 | " | ![structure] phenyl-N(C₂H₄OCH₃)(C₂H₄O)₅CONHC(CH₃)₃ | ruby |
| 27 | 3-phenyl-1,2,4-thiadiazol-5-amine | ![structure] phenyl-N(C₂H₅)(C₂H₄O)₃CON(CH₃)₂ | red |
| 28 | " | ![structure] phenyl-N(C₂H₅)(C₂H₄O)₃CONHCH₃ | red |
| 29 | 5-nitrobenzisothiazol-3-amine | ![structure] phenyl-N(C₂H₅)(C₂H₄O)₄CONHCH₃ | reddish-tinged blue |
| 30 | " | ![structure] 3-methylphenyl-NH(C₂H₄O)₄CON(CH₃)₂ | black |
| 31 | " | ![structure] 3-NHCOCH₃-phenyl-N(C₂H₄OCONHCH₃)(C₂H₄O)₃CH₃ | blue-green |

-continued

| No. | Diazo component | Coupling component | Colour shade on polyester |
|---|---|---|---|
| 32 | " | 4-OCH$_3$, 3-NHCOCH$_3$ aniline with N-substituent: NH(C$_2$H$_4$O)$_4$CONHCH$_3$ | bluish-tinged green |
| 33 | 7-Cl, 5-NO$_2$ benzoisothiazole-3-amine | 3-CH$_3$-aniline, N(CH$_3$)(C$_2$H$_4$O)$_4$CONHCH$_3$ | greenish-tinged blue |
| 34 | 4-NC, 2-CN aniline (NH$_2$) | aniline, N(C$_2$H$_5$)(C$_2$H$_4$O)$_4$CONHCH$_3$ | red |
| 35 | 3-phenyl-1,2,4-thiadiazol-5-amine | aniline, N(C$_2$H$_4$OCH$_3$)(C$_2$H$_4$O)$_3$CONHCH(CH$_3$)$_2$ | red |
| 36 | " | aniline, N(C$_2$H$_4$CN)(C$_2$H$_4$O)$_3$CONHCH$_3$ | scarlet |
| 37 | " | aniline, N(C$_2$H$_4$CN)(C$_2$H$_4$O)$_4$CONH$_2$ | scarlet |
| 38 | " | 3-CH$_3$-aniline, N(C$_2$H$_4$OCH$_3$)(C$_2$H$_4$O)$_3$CONH$_2$ | red |
| 39 | " | aniline—N(C$_2$H$_4$OC$_2$H$_4$OCONHCH$_3$)$_2$ | red |
| 40 | " | aniline—N(C$_2$H$_4$OC$_2$H$_4$OCON(CH$_3$)$_2$)$_2$ | red |
| 41 | " | 3-NHCOOCH$_3$-aniline, N(C$_2$H$_5$)(C$_2$H$_4$O)$_3$CONHCH(CH$_3$)$_2$ | bluish-tinged red |
| 42 | " | aniline, N(C$_2$H$_4$OCON(CH$_3$)$_2$)(C$_2$H$_4$O)$_4$CON(CH$_3$)$_2$ | red |
| 43 | " | aniline, N(C$_2$H$_4$OCONHCH$_3$)(C$_2$H$_4$O)$_3$CONHCH$_3$ | red |
| 44 | " | aniline, N(C$_2$H$_4$OCONHC$_4$H$_9$)(C$_2$H$_4$O)$_4$CONHC$_4$H$_9$ | red |

-continued

| No. | Diazo component | Coupling component | Colour shade on polyester |
|---|---|---|---|
| 45 | " | ![Ph-N(C2H4OCONHCH3)((C2H4O)2CONHCH3)] | red |
| 46 | O2N—C6H3(Cl)—NH2 | ![Ph-N(C2H4OCONHC4H9)((C2H4O)4CONHC4H9)] | red |
| 47 | " | ![3-CH3-C6H4-N(C2H4OCONHCH3)((C2H4O)2CONHCH3)] | red |
| 48 | " | ![Ph-N(C4H8OCON(CH3)2)((C4H8O)2CON(CH3)2)] | red |
| 49 | " | ![Ph-N(C2H4OCON(CH3)2)((C2H4O)3CON(CH3)2)] | red |
| 50 | " | ![Ph-N(C2H4OCONHC2H4OCH3)((C2H4O)3CONHC2H4OCH3)] | red |
| 51 | " | ![Ph-N(C2H4OCONHC2H4Cl)((C2H4O)4CONHC2H4Cl)] | red |
| 52 | " | ![Ph-N(C2H4OCONHC2H4CN)((C2H4O)4CONHC2H4CN)] | red |
| 53 | " | ![Ph-N(C2H4OCON(CH3)C2H4CN)((C2H4O)5CON(CH3)C2H4CN)] | red |
| 54 | " | ![2-NHCOCH3-C6H4-N((C2H4O)3CONHCH3)2] | ruby |
| 55 | " | ![3-CH3-C6H4-N(C2H4OC2H4OCONHCH3)2] | red |
| 56 | O2N—C6H3(CN)—NH2 | ![Ph-N(C2H4OCONHCH3)((C2H3O)3CONHCH3)] | red |
| 57 | " | ![Ph-N(C2H4OCONHC2H4CN)((C2H4O)4CONHC2H4CN)] | red |

-continued

| No. | Diazo component | Coupling component | Colour shade on polyester |
|---|---|---|---|
| 58 | " | 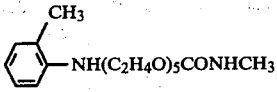 2-CH₃-C₆H₄-NH(C₂H₄O)₅CONHCH₃ | red |
| 59 | " | 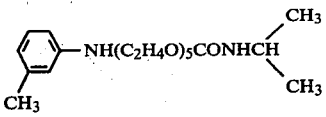 3-CH₃-C₆H₄-NH(C₂H₄O)₅CONHCH(CH₃)₂ | red |
| 60 | 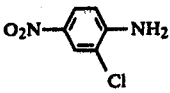 2-NO₂-6-Cl-C₆H₃-NH₂ (O₂N, Cl, NH₂) | 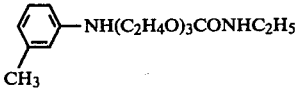 3-CH₃-C₆H₄-NH(C₂H₄O)₃CONHC₂H₅ | red |
| 61 | 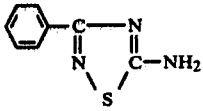 2-amino-5-phenyl-1,3,4-thiadiazole | " | red |
| 62 | " | 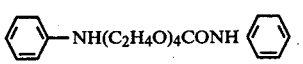 C₆H₅-NH(C₂H₄O)₄CONH-C₆H₅ | red |
| 63 | " | 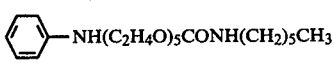 C₆H₅-NH(C₂H₄O)₅CONH(CH₂)₅CH₃ | red |
| 64 | " | 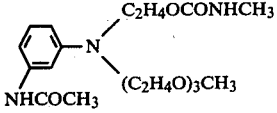 3-NHCOCH₃-C₆H₄-N(C₂H₄OCONHCH₃)(C₂H₄O)₃CH₃ | bluish-tinged red |
| 65 | " | 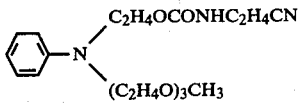 C₆H₅-N(C₂H₄OCONHC₂H₄CN)(C₂H₄O)₃CH₃ | red |
| 66 | " | 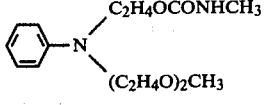 C₆H₅-N(C₂H₄OCONHCH₃)(C₂H₄O)₂CH₃ | red |
| 67 | " | 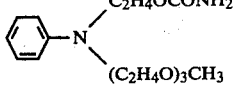 C₆H₅-N(C₂H₄OCONH₂)(C₂H₄O)₃CH₃ | red |
| 68 | " | 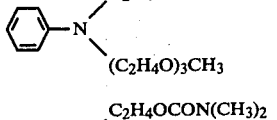 C₆H₅-N(C₂H₄OCONHC₄H₅)(C₂H₄O)₃CH₃ | red |
| 69 | " | 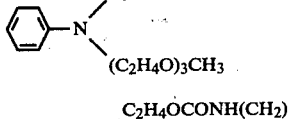 C₆H₅-N(C₂H₄OCON(CH₃)₂)(C₂H₄O)₃CH₃ | red |
| 70 | " | 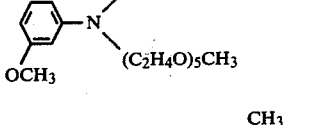 3-OCH₃-C₆H₄-N(C₂H₄OCONH(CH₂)₆Cl)(C₂H₄O)₅CH₃ | red |
| 71 | 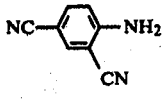 2,4-dicyano-aniline (NC, CN, NH₂) | 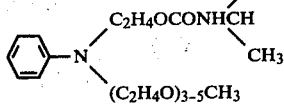 C₆H₅-N(C₂H₄OCONHCH(CH₃)₂)(C₂H₄O)₃₋₅CH₃ | red |

-continued

| No. | Diazo component | Coupling component | Colour shade on polyester |
|---|---|---|---|
| 72 | O₂N—⌬(Cl)—NH₂ | " | red |
| 73 | " | ⌬—N(C₂H₄OCONHCH₃)((C₂H₄O)₂CH₃) | red |
| 74 | " | ⌬—N(C₂H₄OCONHCH₃)((C₂H₄O)₅⌬) | red |
| 75 | " | ⌬—N(C₂H₄OCONHCH₃)((C₂H₄O)₄C₄H₉) | red |
| 76 | " | ⌬—N(C₂H₄OCONH⌬)((C₂H₄O)₆CH₃) | red |
| 77 | " | ⌬—N(C₂H₄OCONH(CH₂)₅CH₃)((C₂H₄O)₅CH₃) | red |
| 78 | " | (3-OCH₃)⌬—N(C₂H₄OCONHC₂H₄CN)((C₂H₄O)₃CH₃) | red |
| 79 | " | (3-CH₃)⌬—N(C₂H₄OCONH₂)((C₂H₄O)₃CH₃) | red |
| 80 | " | ⌬—N(C₂H₄OCONHC₄H₅)((C₂H₄O)₃CH₃) | red |
| 81 | " | ⌬—N(C₂H₄OCONHC₂H₄Cl)((C₂H₄O)₃CH₃) | red |
| 82 | " | ⌬—N(C₂H₄OCONHC₂H₄OCH₃)((C₂H₄O)₂CH₃) | red |
| 83 | " | (2-OCH₃, 4-NHCOCH₃)⌬—N(C₂H₄OCONHCH₃)((C₂H₄O)₃CH₃) | ruby |
| 84 | O₂N—⌬(Br)(CN)—NH₂ | " | blue |

-continued
| No. | Diazo component | Coupling component | Colour shade on polyester |
|---|---|---|---|
| 85 | 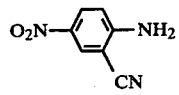 | 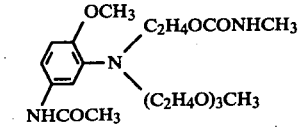 | violet |
| 86 | 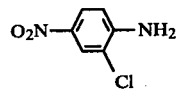 | 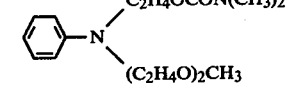 | red |
| 87 | 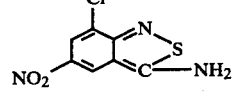 | 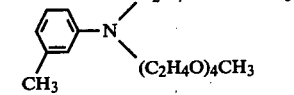 | greenish-tinged blue |
| 88 | " |  | blue-green |
| 89 | " | 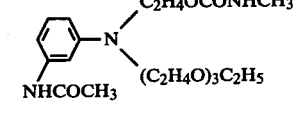 | bluish-tinged green |
| 90 | " |  | blue |
| 91 | 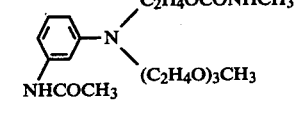 |  | greenish-tinged blue |
| 92 | " | 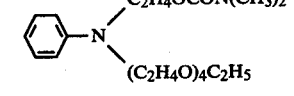 | blue |
| 93 | 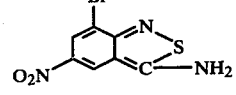 | 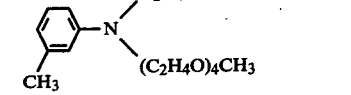 | blue |
| 94 | " |  | blue-green |
| 95 | 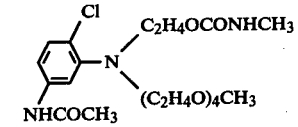 | 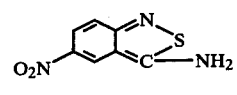 | blue |
| 96 | 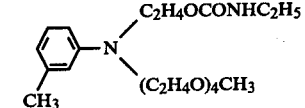 | " | blue |

-continued

| No. | Diazo component | Coupling component | Colour shade on polyester |
|---|---|---|---|
| 97 | " | 4-N(CH₃)₂, 2-O(C₂H₄O)₄CONHCH₃, 5-NHCOCH₃ phenyl | blue |
| 98 | " | 2-O(C₂H₄O)₄CONHCH₃, 4-N(C₂H₅)₂ phenyl | claret |
| 99 | " | 2-O(C₂H₄O)₅CONHCH₃, 4-N(CH₃)(C₂H₄OCONHCH₃) phenyl | claret |
| 100 | 4-O₂N, 2-NH₂, 1-COO(C₂H₄O)₃CH₃ benzene | C₆H₅-N(C₂H₅)(C₂H₄OCONHCH₃) | red |
| 101 | " | 3-CH₃-C₆H₄-N(C₂H₄OCONHCH₃)(C₂H₄OC₂H₄OCONHCH₃) | red |
| 102 | CH₃O(C₂H₄O)₄CO-, 2-NH₂, 3-CN benzene | 3-NHCOCH₃-C₆H₄-N(C₂H₄OCONHCH₃)(C₄H₈OCONHCH₃) | violet |
| 103 | " | 3-NHCOCH₂OCONHCH₃-C₆H₄-N(CH₃)(C₂H₄OCONHCH₃) | violet |
| 104 | " | 3-NHCOCH₂OCONHCH₃-C₆H₄-N(CH₃)₂ | violet |
| 105 | CH₃O(C₂H₄O)₄CO-, 2-CN, 4-NH₂ benzene | C₆H₅-N(CH₃)(C₂H₄OCONHC₂H₅) | orange |
| 106 | CH₃NHCOO(C₂H₄O)₃CO-, 4-NH₂, 3-Br benzene | " | orange |
| 107 | " | C₆H₅-N(C₂H₅)₂ | orange |
| 108 | 4-O₂N-C₆H₄-NH₂ | 1-HO, 5-NH(C₂H₄O)₄CONHC₂H₅ naphthalene | red |
| 109 | CH₃NHCOOCH₂CONH-, 2-NH₂, 3-Cl benzene | C₆H₅-O(C₂H₄O)₂CH₃ | yellow |

-continued

| No. | Diazo component | Coupling component | Colour shade on polyester |
|---|---|---|---|
| 110 | " | 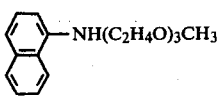 naphthyl-NH(C₂H₄O)₃CH₃ | orange |
| 111 | 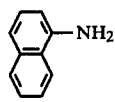 naphthyl-NH₂ | 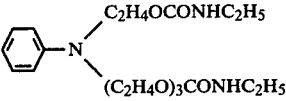 phenyl-N(C₂H₄OCONHC₂H₅)((C₂H₄O)₃CONHC₂H₅) | orange |
| 112 | CH₃NHCOO(C₂H₄O)₄CO—⟨phenyl⟩—NH₂ |  3-methyl-5-hydroxy-1-phenylpyrazole-4-yl | yellow |
| 113 | " | 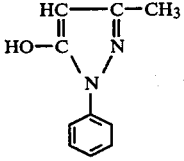 5-amino-3-methyl-1-phenylpyrazole | yellow |
| 114 | " | 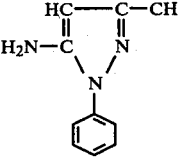 pyrazole with CON(CH₃)₂ and OH, N-phenyl | yellow |
| 115 | CH₃NHCOO(C₂H₄O)₄CO—⟨phenyl, NO₂⟩—NH₂ | 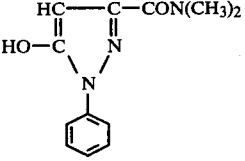 pyrazole with CH₃, OH, N-C₂H₄CN | yellow |
| 116 | CH₃O(C₂H₄O)₃CO—⟨phenyl⟩—NH₂ | 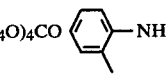 pyrazole with CH₃, CONC₂H₄OCONHC₂H₅, N-phenyl | yellow |
| 117 | CH₃NHCOOC₂H₄OCO—⟨benzoisothiazole⟩—NH₂ | 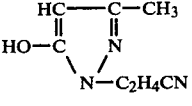 phenyl with CH₃, N(CH₃)(C₂H₄O)₂H | violet |
| 118 | CH₃NHCOOC₂H₄O—C=O, NO₂, benzoisothiazole—NH₂ | 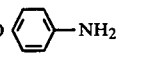 phenyl with CH₃, N(CH₃)(C₂H₄O)₄CH₃ | blue |
| 119 | O₂N—⟨phenyl⟩—NH₂, COO(C₂H₄O)CONHCH₃ | 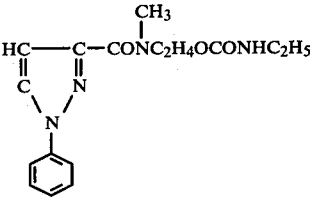 phenyl-N((C₂H₄O)₂CH₃)₂ | ruby |
| 120 | " | 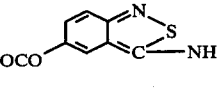 phenyl with O(C₂H₄O)₂CH₃, NH(C₂H₄O)₂CH₃ | ruby |

-continued

| No. | Diazo component | Coupling component | Colour shade on polyester |
|---|---|---|---|
| 121 | CH$_3$O(C$_2$H$_4$O)$_3$CH$_2$CO—C$_6$H$_3$(SO$_2$CH$_3$)—NH$_2$ | C$_6$H$_5$—N(CH$_3$)—C$_2$H$_4$OCONHC$_2$H$_5$ | red |
| 122 | CH$_3$O(C$_2$H$_4$O)$_3$CH$_2$CO—C$_6$H$_4$—NH$_2$ | pyrazolone: HC=C(CH$_3$)—N(C$_2$H$_4$OCONHC$_4$H$_9$)—N=C—OH | yellow |
| 123 | C$_3$H$_7$O(C$_2$H$_4$O)CO—C$_6$H$_4$—NH$_2$ | " | yellow |
| 124 | O$_2$N—C$_6$H$_4$—NH$_2$ | C$_6$H$_5$—N(C$_2$H$_5$)—C$_2$H$_4$NHCOO(C$_2$H$_4$O)$_4$C$_4$H$_9$ | orange |
| 125 | " | 3-CH$_3$-C$_6$H$_4$—N(C$_2$H$_4$OCONHCH$_3$)—C$_2$H$_4$N(CH$_3$)COO(C$_2$H$_4$O)$_3$C$_3$H$_7$ | orange |
| 126 | " | 2-OCH$_3$-5-CH$_3$-C$_6$H$_3$—N(CH$_3$)—(C$_2$H$_4$O)$_3$C$_2$H$_4$NHCOOC$_2$H$_5$ | orange |
| 127 | O$_2$N—C$_6$H$_3$(CH$_2$N(CH$_3$)COOCH$_3$)—NH$_2$ | 3-OCH$_3$-C$_6$H$_4$—N(C$_2$H$_5$)—(C$_2$H$_4$O)$_3$CH$_3$ | orange |
| 128 | C$_2$H$_5$S—C(=N—N=)—S—C—NH$_2$ (thiadiazole) | 3-NHCOCH$_3$-C$_6$H$_4$—NH(C$_2$H$_4$O)$_2$C$_2$H$_4$OCONHCH$_3$ | red |
| 129 | " | 3-NHCOCH$_3$-C$_6$H$_4$—N(CH$_3$)—(C$_2$H$_4$O)$_3$CONHCH$_3$ | red |
| 130 | O$_2$N—benzothiazol-2-yl-NH$_2$ | C$_6$H$_5$—N(C$_2$H$_4$CN)—(C$_2$H$_4$O)$_4$CONHCH$_3$ | red |
| 131 | " | 3-CH$_3$-C$_6$H$_4$—N(C$_2$H$_4$OCH$_3$)—(C$_2$H$_4$O)$_4$CON(CH$_3$)$_2$ | red |
| 132 | 2,6-Br$_2$-4-O$_2$N-C$_6$H$_2$—NH$_2$ | C$_6$H$_5$—N(C$_2$H$_4$OCONHCH$_3$)—(C$_2$H$_4$O)$_3$C$_2$H$_5$ | red |

-continued

| No. | Diazo component | Coupling component | Colour shade on polyester |
|---|---|---|---|
| 133 | " | 3-CH₃-C₆H₄-N(C₂H₄OCONHCH₃)((C₂H₄O)₄CH₃) | red |
| 134 | " | C₆H₅-N(C₂H₅)((C₂H₄O)₄CONHCH₃) | red |
| 135 | 2-amino-3-nitro-5-nitro-benzonitrile (2-NH₂, 3-NO₂, 5-O₂N, CN) | 3-NHCOCH₃-C₆H₄-N(CH₃)((C₂H₄O)₅CONHCH₃) | blue |
| 136 | " | 3-NHCOCH₂OCH₃-C₆H₄-NH(C₂H₄O)₅CONHCH₃ | blue |
| 137 | 2-amino-5-methyl-benzene-1,3-dicarbonitrile (CH₃, CN, NH₂, CN) | C₆H₅-N(C₂H₄OCONHCH₃)((C₂H₄O)₄CH₃) | red |
| 138 | 2-amino-4-chloro-benzene-1,3-dicarbonitrile (Cl, CN, NH₂, CN) | C₆H₅-N(C₂H₄OCONHCH₃)((C₂H₄O)₄CH₃) | red |
| 139 | 3-acetyl-2,5-diamino-thiophene (CH₃COC=CH, C-NH₂, C-NH₂, S) | " | blue |
| 140 | " | 3-NHCOH-C₆H₄-N(CH₃)((C₂H₄O)₄CONHCH₃) | blue |
| 141 | " | 3-NHCOCH₂OCONHCH₃-C₆H₄-N((C₂H₄O)₂CH₃)₂ | blue |
| 142 | 5-phenyl-3-amino-1,2,4-thiadiazole | C₆H₅-N(C₂H₄OCONHC₂H₅)((C₂H₄O)₂CH₃) | red |
| 143 | " | 3-NHCOC₂H₅-C₆H₄-N(C₂H₄OCONHCH₃)((C₂H₄O)₂CH₃) | red |
| 144 | 3-benzylthio-5-amino-1,2,4-thiadiazole (C₆H₅CH₂S-C, N, C-NH₂, S) | C₆H₅-N(C₄H₈OCONHCH₃)(C₄H₈O(C₂H₄O)₃CH₃) | red |

-continued

| No. | Diazo component | Coupling component | Colour shade on polyester |
|---|---|---|---|
| 145 | " | 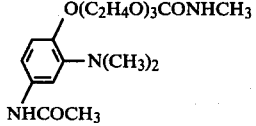 | red |
| 146 | 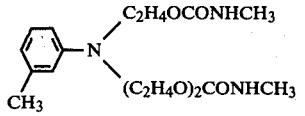 | 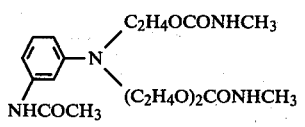 | blue |
| 147 | " | 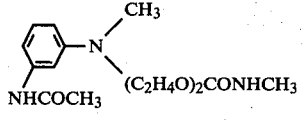 | blue-green |
| 148 | " | 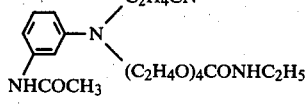 | green |
| 149 | O₂N—⟨⟩—NH₂ | 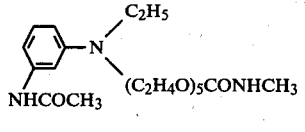 | red |
| 150 | O₂N—⟨⟩—N₂—⟨⟩—NH₂<br>CH₃ | 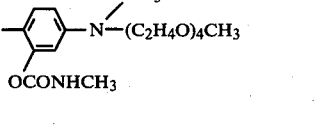 | reddish-tinged blue |
| 151 | | 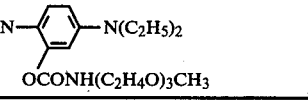 | red |
| 152 | | O₂N—⟨⟩—N=N—⟨⟩—N(C₂H₅)₂<br>Cl      OCONH(C₂H₄O)₃CH₃ | red |

EXAMPLE 151

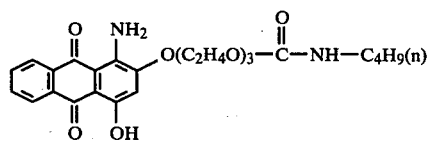

9.5 parts of 1-amino-4-hydroxy-2-[γ-(phenoxycarbonyl)-ethoxy-ethoxy-ethoxy]-anthraquinone are stirred for 1 hour with 50 parts by volume of a 50% strength aqueous n-butylamine solution, at room temperature. The reaction mixture is then introduced into 200 parts by volume of ice water. After filtering off the product, washing it with water and drying it, 8.4 parts of the stated compound are obtained, melting at 86°-7° C. after recrystallisation from pyridine. Following the dyeing instructions in Example 1, a brilliant red dyeing, having very good fastness characteristics, is obtained on polyester.

EXAMPLE 152

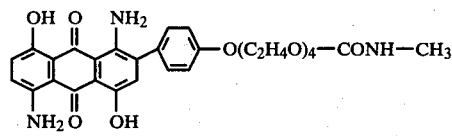

12 parts of 1,5-diamino-4,8-dihydroxy-2-p-hydroxyphenyl-anthraquinone are heated with 4.6 parts of anhydrous potassium carbonate and 18 parts of Cl(C₂H₄O)₄—CONH—CH₃ (prepared by reacting the corresponding chloro-polyether alcohol with methyl isocyanate) in 60 parts by volume of nitrobenzene for 3 hours at ~140° C. After removing the nitrobenzene by steam distillation, the reaction product is separated off by adding about 40 parts of anhydrous sodium sulphate, filtered off, washed with water and dried. 18.5 parts of dyestuff are obtained, which when used in accordance with the instructions in Example 1, gives a brilliant blue dyeing, having very good fastness characteristics, on polyester.

EXAMPLE 153

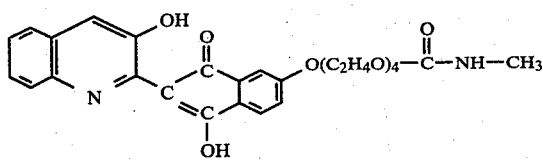

8 parts of dihydroxyquinophthalone, 3.5 parts of anhydrous potassium carbonate and 12.5 parts of Cl—(C$_2$H$_4$O)$_4$—CO—NH—CH$_3$ are heated in 40 parts by volume of nitrobenzene for 5 hours at 140°–150° C. After cooling, the reaction product is filtered off, washed with benzene and water, and dried. 8.4 parts of the stated compound are obtained; the compound dyes polyester materials, in accordance with the instructions in Example 1, in fast yellow shades.

We claim:
1. Dyestuff formulation comprising
  (a) an azo dyestuff which is free from sulphonic acid groups and ammonium groups and which contains at least one of

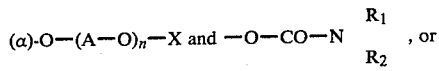

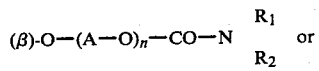

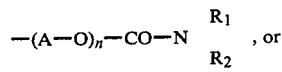

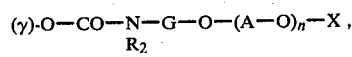

wherein
G is selected from the group consisting of C$_2$–C$_6$ alkylene,

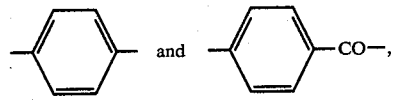

A is C$_2$–C$_6$-alkylene,
X is selected from the group consisting of hydrogen, Y, —COY and —CONR$_1$R$_2$,
Y is selected from the group consisting of alkyl, cycloalkyl, aralkyl, aryl, and substituted alkyl, cycloalkyl, aralkyl and aryl,
R$_1$ is selected from the group consisting of hydrogen and Y,
R$_2$ is selected from the group consisting of hydrogen, alkyl and substituted alkyl, and
n is a number from 1 to 7 and n is at least 2 if X is —COY, and
  (b) an emulsifying polar-nonpolar compound.
2. Dyestuff formulation according to claim 1, wherein said azo dyestuff is

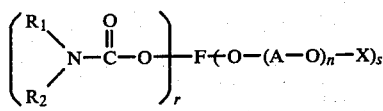

wherein
F is a radical of azo dystuff which is free from sulphonic acid groups and ammonium groups,
A is a straight-chain C$_2$–C$_6$-alkylene radical,
R$_1$ is selected from the group consisting of hydrogen, cycloalkyl, aralkyl, aryl, halogen-free C$_1$–C$_4$-alkyl and substituted cycloalkyl, aralkyl, aryl and halogen-free C$_1$–C$_4$-alkyl,
R$_2$ is selected from the group consisting of C$_1$–C$_4$-alkyl and hydrogen,
r 1 or 2,
s is 1 or 2 and
n is a number from 1 to 6, n is at least 2 if X is —COY and n is at least 3 if R$_1$ is phenyl.
3. Dyestuff formlation according to claim 2 wherein said azo dyestuff is

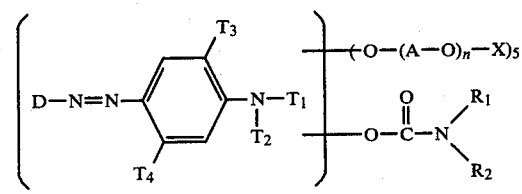

wherein
D is a radical of a diazo component of a series selected from the group consisting of the benzthiazole series, the benzisothiazole series, the thiazole series, the thiadiazole series, the thiophene series and the benzene series,
T$_1$ is selected from the group consisting of hydrogen, alkyl, aralkyl and substituted alkyl and aralkyl,
T$_2$ is selected from the group consisting of T$_1$, aryl and substituted aryl,
T$_3$ is selected from the group consisting hydrogen, alkyl, phenoxy, alkoxy and halogen, and
T$_4$ is selected from the group consisting of T$_3$ and acylamino.
4. Dyestuff formulation according to claim 3 wherein the radical —O—(A—O)$_n$—X is bonded to one or more of the radicals T$_1$ and/or T$_2$ and wherein said bound radical T$_1$ and/or T$_2$ is a hydrocarbon radical.
5. Dyestuff formulation according to claim 3, wherein
D is a radical of a series selected from the group consisting of the benzisothiazole series, the 1,3,5-thiadiazole series, the 1,3,4-thiadiazole series and the benzene series,
T$_1$ is selected from the group consisting of H, C$_1$–C$_4$-alkyl, C$_1$–C$_4$-alkylene-Z and C$_1$–C$_4$-alkylene-W$_2$,
T$_2$ is selected from the group consisting of C$_1$–C$_4$-alkyl and C$_1$–C$_4$-alkylene-W$_2$,
T$_3$ is selected from the group consisting of H, methyl, ethyl, methoxy, ethoxy and Cl,
T$_4$ is selected from the group consisting of T$_3$, formylamino, and C$_1$–C$_4$-alkylcarbonylamino which is optionally substituted by C$_1$–C$_2$-alkoxy,
n is 2 to 4,
s is 1 or 2, Z is selected from the group consisting of OH, OCH$_3$, CN, phenoxy, phenyl, C$_1$–C$_4$-alkylsulphonyl and C$_1$–C$_4$-alkylcarbonyl, R$_1$ is selected from the group consisting of hydrogen, methyl, ethyl and cyanoethyl, R$_2$ is hydrogen, W$_1$ is —O—(C$_2$–C$_4$-alkylene-O)$_n$—X′, W$_2$ is —OCONZ$_1$Z$_2$, and X′ is selected from the group consisting of H, C$_1$–C$_4$-alkyl, phenyl, C$_2$–C$_4$-chloroalkyl, cyanoethyl, C$_1$–C$_4$-alkylcarbonyl and benzoyl, and wherein at least one radical W$_1$ and one radical W$_2$ is present and n is at least 2 if X′ is alkylcarbonyl or benzoyl.

6. Dyestuff formulation according to claim 3, wherein D is

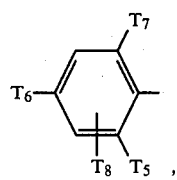

T$_5$ to T$_7$ are selected from the group consisting of hydrogen, Cl, Br, NO$_2$, CH$_3$, CF$_3$, CN, COO—C$_1$–C$_4$-alkyl, SO$_2$CH$_3$ and SO$_2$C$_2$H$_5$, but are not simultaneously H or NO$_2$, and T$_8$ is selected from the group consisting of hydrogen, Cl and CN.

7. Dyestuff formulation according to claim 6, wherein said azo dyestuff is of the formula

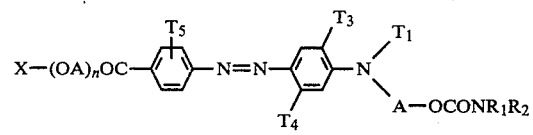

wherein T$_5$ is selected from the group consisting of H, Cl, NO$_2$ and COO—C$_1$–C$_4$-alkyl.

8. Dyestuff formulation according to claim 2, wherein said azo dyestuff is of the formula

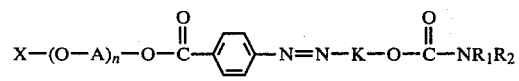

wherein K is the radical of a heterocyclic coupling component.

9. Dyestuff formulation according to claim 2, wherein said azo dyestuff is of the formula

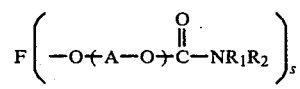

10. Dyestuff formulation according to claim 1, wherein said azo dyestuff is of the formula

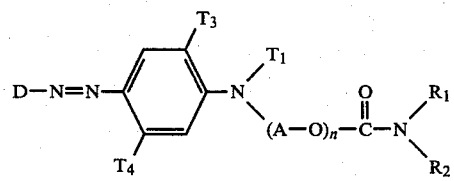

D is a radical of a diazo components of a series selected from the group consisting of the benzthiazole series, the benzisothiazole series, the thiazole series, the thiadiazole series, the thiophene series and the benzene series, T$_1$ is selected from the group consisting of hydrogen, alkyl, aralkyl and substituted alkyl and aralkyl, T$_3$ is selected from the group consisting of hydrogen, alkyl, phenoxy, alkoxy and halogen, and T$_4$ is selected from the group consisting of T$_3$ and acylamino.

11. Dyestuff formulation according to claim 1, wherein said azo dyestuff is of the formula

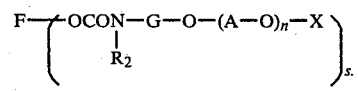

wherein

F is a radical of azo dyestuff which is free from sulphonic acid groups and ammonium groups, A is a straight-chain C$_2$–C$_6$-alkylene radical, and s is 1 or 2.

12. Dyestuff formulation according to claim 1, wherein said azo dyestuff is of the formula

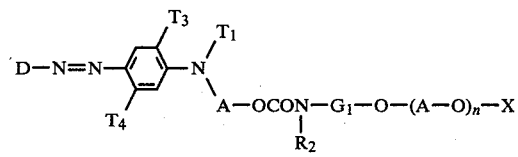

wherein

G$_1$ is C$_2$–C$_3$-alkylene,

D is a radical of a diazo component of a series selected from the group consisting of the benzthiazole series, the benzisothiazole series, the thiazole series, the thiadiazole series, the thiophene series and the benzene series, T$_1$ is selected from the group consisting of hydrogen, alkyl, aralkyl and substituted alkyl and aralkyl, T$_3$ is selected from the group consisting of hydrogen, alkyl, phenoxy, alkoxy and halogen, and T$_4$ is selected from the group consisting of T$_3$ and acylamino.

13. Process for dyeing hydrophobic fiber materials, characterized in that dyestuff formulations according to claim 1 are used.

14. Dyestuff formulation according to claim 2, wherein the dyestuffs are of the formula

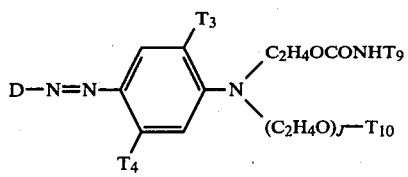

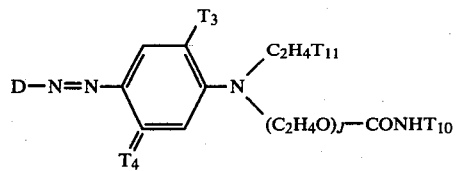

wherein
- D is a radical of a diazo component of a series selected from the group consisting of the benzthiazole series, the benzisothiazole series, the thiazole series, the thiadiazole series, the thiophene series and the benzene series,
- $T_3$ is selected from the group consisting of hydrogen, alkyl, phenoxy, alkoxy and halogen,
- $T_4$ is selected from the group consisting of $T_3$ and acylamino,
- $T_9$ and $T_{10}$ are $C_1$–$C_4$-alkyl and
- J is 2 to 5.

15. Dyestuff formulation according to claim 2, wherein the dyestuffs are of the formula wherein
- D is a radical of a diazo component of a series selected from the group consisting of the benzthiazole series, the benzisothiazole series, the thiazole series, the thiadiazole series, the thiophene series and the benzene series,
- $T_3$ is selected from the group consisting of hydrogen, alkyl, phenoxy, alkoxy and halogen,
- $T_4$ is selected from the group consisting of $T_3$ and acylamino,
- $T_{10}$ are $C_1$–$C_4$-alkyl,
- J is 2 to 5, and
- $T_{11}$ is selected from the group consisting of H, Cl, OH, CN and $OCH_3$.

16. Dyestuff formulation according to claim 14, wherein $T_9$ and $T_{10}$ are $C_1$–$C_2$-alkyl.

* * * * *